Figure 1:
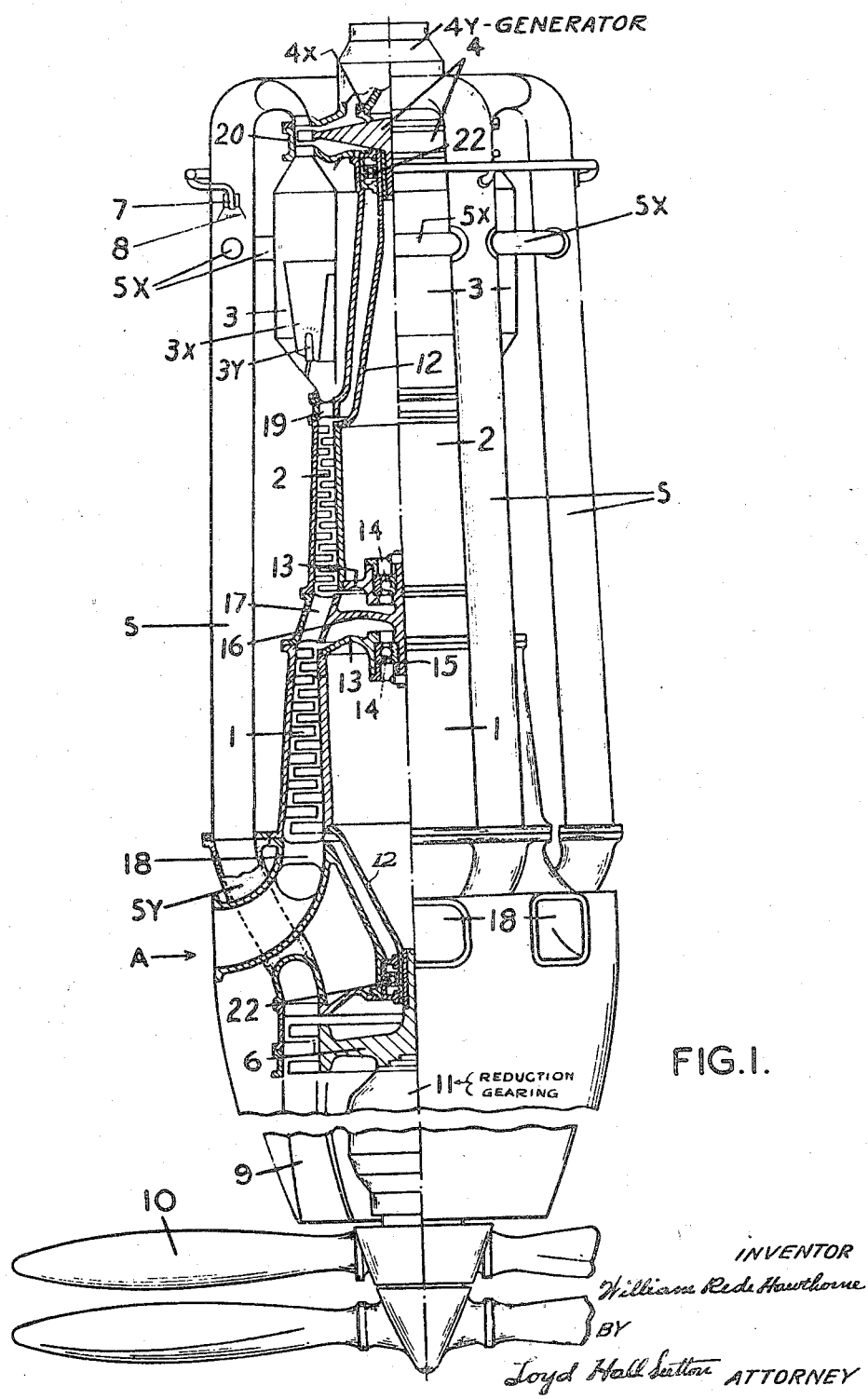

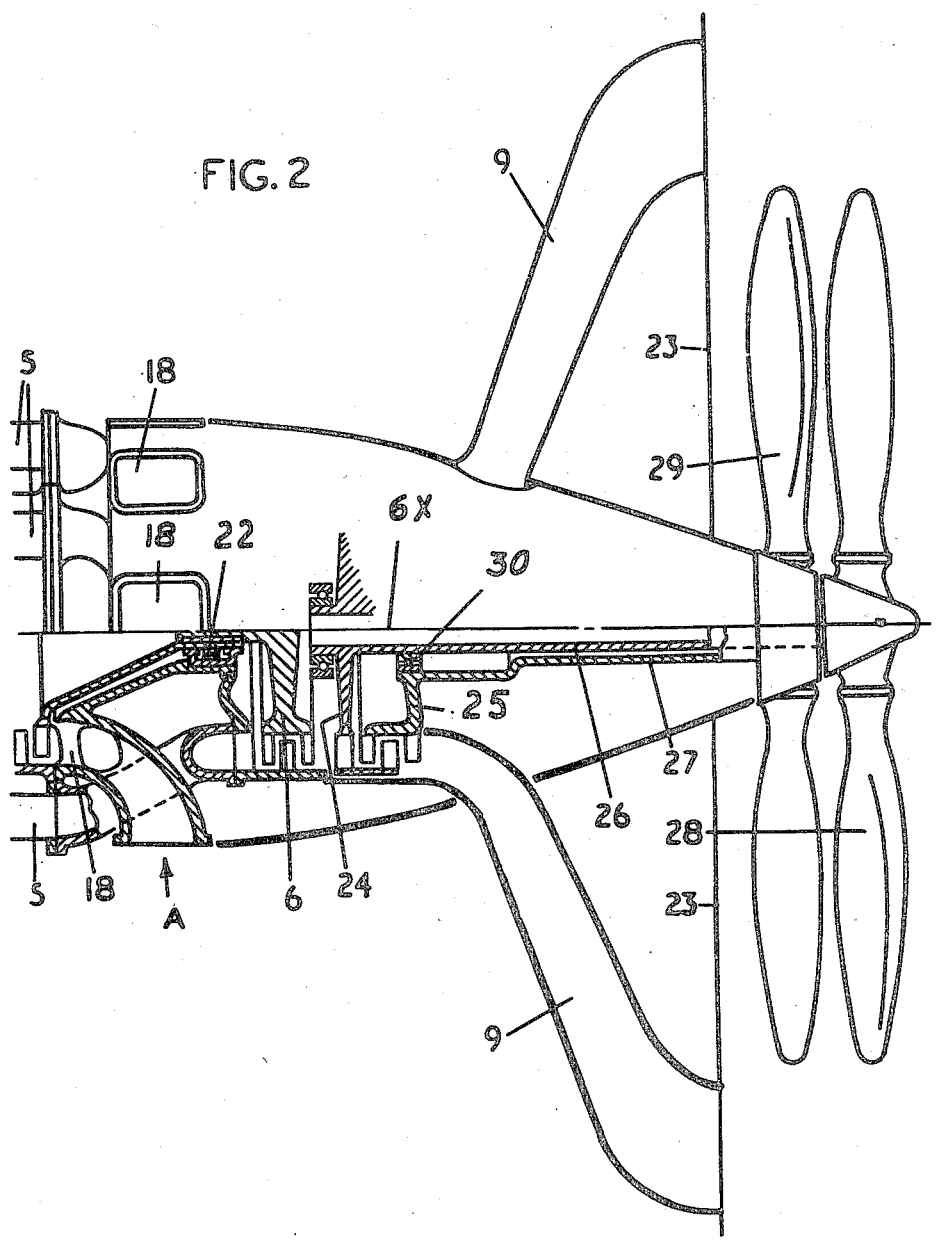

Patented Apr. 18, 1950

2,504,414

UNITED STATES PATENT OFFICE 2,504,414

GAS TURBINE PROPULSION UNIT

William Rede Hawthorne, Silver Spring, Md., assignor to Power Jets (Research and Development) Limited, London, England Application October 10, 1944, Serial No. 558,024
In Great Britain October 11, 1943

3 Claims. (Cl. 60—35.6)

This invention relates to internal combustion turbine power plants for aircraft propulsion and of the type referred to herein as double compound engines, having two mechanically independent rotors capable of running at different rotational speeds, each of which consists of a compressor assembled as a single rotary unit with a turbine, and ducting interconnecting said rotors so that air passes successively and in the order named through the low and high pressure compressors, combustion means in which fuel is injected and burnt continuously, and the high and low pressure turbines in which the gaseous products of combustion are expanded so as to cause them to drive their respective compressors. The references herein and in the appended claims to engines of the type referred to are to be read as meaning an engine having the characteristics described in the foregoing, and as including modifications thereof in which the useful power, and in certain arrangements the efficiency also, is materially increased by employing reheating, which consists in injecting and burning additional fuel in the gaseous combustion products at a point or points between adjacent turbines or turbine stages; or in which power is also taken from a separate power turbine driven by the expanding gases; but does not include the case where more than two turbine-compressor units are employed. It is an object of the invention to adapt such an engine for use as an aircraft propulsion unit.

The most efficient and flexible operation of an engine of the type referred to is obtained where the high pressure turbine drives the high pressure compressor and the low pressure turbine drives the low pressure compressor. This desirable arrangement has hitherto entailed, in actual design, either the use of complicated ducting, with consequent excessive pressure losses, or the use of concentric shafts and considerable attendant mechanical complication. Moreover, if reheating is employed and combustion in the turbine blading is to be avoided, the design is further complicated in providing sufficient space for completion of the combustion.

The present invention relates particularly to compound engines having low-pressure and high-pressure turbine driven compressors only, and in which the low-pressure and high-pressure compressors are arranged coaxially adjacent to one another so as to secure a compact unit suitable for nacelle installation, the chief object being to provide a double compound engine of this kind in which the mechanical complication of concentric shafting is avoided and the ducting between the high-pressure turbine and the low-pressure turbine is of a simple form and can be employed conveniently for reheating if this is required.

It is a feature of the invention that the two rotors are arranged coaxially with their compressors adjacent to one another and wholly between the turbines which are located at opposite extreme ends of the engine, and annular combustion chamber means are arranged coaxially with and between the high pressure compressor and the high pressure turbine.

Shaft power may be taken from either the high-pressure compressor turbine or the low-pressure compressor turbine, or from both these turbines, or a separate turbine for this purpose may be arranged coaxially adjacent to either the high or low pressure compressor turbine. The energy of the gases leaving the low-pressure compressor turbine, or the low-pressure power turbine where one is provided, may be used in the form of a jet or jets.

This arrangement enables a substantial length of ducting of simple form to be employed between the exhaust side of the high-pressure turbine and the inlet side of the low pressure turbine, which ducting affords adequate combustion space for the effective reheating of the gases where this is required.

The invention will now be described with reference to the accompanying drawings, Fig. 1 of which illustrates, by way of example, a radial section of a double compound engine for aircraft propulsion, and Fig. 2 of which is a fragmentary view illustrating a modification.

Referring to Fig. 1 of the drawings, air enters radially, as indicated by arrows at A, and flows forward axially through the low and high pressure compressors 1, 2 respectively which are arranged coaxially and in tandem adjacent to one another. The air leaving the high pressure compressor 2 flows directly into an annular combustion chamber 3 having annular flame zone defining baffles 3x and burner nozzles 3y, and into which fuel is injected and burnt and from which the gaseous products of combustion pass forwardly into an axial flow high pressure turbine 4. This high-pressure turbine 4 has its rotor mechanically connected to the rotor of the high-pressure compressor 2 which it drives, and the gases leaving the high-pressure turbine 4 enter ducting 5 which reverses the direction of flow and conducts the gases rearwardly to a low-pressure turbine 6 which is located beyond the rear or inlet end of the low-pressure compressor 1 and has its rotor mechanically connected to the rotor of said low-pressure compressor 1 which it drives.

The ducting comprises a plurality of pipes 5 arranged around the compound engine, and they may be fitted with fuel injectors 7 and baffles 8 so that fuel may be burned to reheat the gases passing to the low-pressure turbine 6. In this latter connection, the flame zones of the reheating combustion chambers afforded by these pipes 5 may be inter-connected by pipes 5x so as to ensure rapid ignition in all the chambers. Where the pipes 5 cross the air inlet to the low-pressure compressor 1 they are preferably insulated therefrom for example by lagging 5y.

The energy of the gases issuing from the low-pressure turbine 6 may be used to propel the aircraft by providing means for dividing the gases into two or more streams which pass through nozzles, such as at 9, which, as shown in Fig. 2, may be situated at the trailing edge 23 of the aircraft wing or fuselage.

Shaft power may be taken from the rotor of the low-pressure turbine 6 and used to drive a pusher airscrew 10 or a fan, through reduction gearing 11 as shown, whilst a drive for accessories such as a generator 4y may be taken from the rotor of the high-pressure turbine 4, as indicated at 4x, at the front end of the compound engine.

The turbine rotor shafts are connected to the adjacent or outer ends of the compressor rotors, which they respectively drive, by conical members 12 and the inner ends of the compressor rotors are supported by cranked discs 13 mounted upon ball bearings 14. The bearings 14 are mounted upon a short shaft 15 which is formed integrally with a cranked disc 16 and short ducting 17 which connects the flow annuli of the two compressors. Stator ducting elements 18, 19 and 20 are supported by discs or spiders 21 on ball bearings 22.

In a modification, illustrated in Fig. 2, the gases pass from the low pressure turbine to a separate power turbine comprising contra-rotating bladed elements 24, 25 which through concentric shafts 26, 27 drive the contra-rotating parts 28, 29 of a pusher type propeller.

What I claim as my invention and desire to secure by Letters Patent is:

1. A double compound internal combustion turbine engine of the type referred to, designed as an aircraft propulsion unit, comprising a rotor consisting of an axial flow low pressure compressor and an axial flow low pressure turbine and a rotor consisting of an axial flow high pressure compressor and an axial flow high pressure turbine rotatable independently of and arranged coaxially adjacent to one another so that the low pressure turbine, low pressure compressor, high pressure compressor and high pressure turbine are in that serial order from rear to front of the propulsion unit (considered in relation to the direction of flight), the air entry being at the rear end of the low pressure compressor and the low pressure turbine exhausting rearwardly without terminal reversal of flow, combustion means annularly disposed between the high pressure compressor and high pressure turbine, and ducting interconnecting said compressors, turbines and combustion means which is disposed annularly about their common axis and is so constructed and arranged as to provide a generally axial flow path through the low and high pressure compressors, combustion means, and high and low pressure turbines in that order, with reversal of the general direction of flow between the turbines.

2. An internal combustion turbine engine as claimed in claim 1, wherein the low pressure turbine at the rear of the engine drives a pusher airscrew also at the rear of the engine.

3. A double compound internal combustion turbine engine of the type referred to, designed as an aircraft propulsion unit, comprising a rotor consisting of a low pressure compressor and an axial flow low pressure turbine and a rotor consisting of a high pressure compressor and an axial flow high pressure turbine rotatable independently of and arranged coaxially adjacent to one another so that the low pressure turbine, low pressure compressor, high pressure compressor and high pressure turbine are in that serial order from rear to front of the propulsion unit (considered in relation to the direction of flight), the air entry being at the rear end of the low pressure compressor and the low pressure turbine exhausting rearwardly without terminal reversal of flow, combustion means annularly disposed between the high pressure compressor and high pressure turbine, and ducting interconnecting said compressors, turbines and combustion means which is disposed annularly about their common axis and is so constructed and arranged as to provide a general direction of flow in the intended direction of flight through the low and high pressure compressors, combustion means, and high pressure turbine in that order, and flow contrary to the intended direction of flight from the high pressure to the low pressure turbine, said inter-turbine ducting being annularly disposed around the low pressure turbine and low and high pressure compressors, including the inlet end of the high pressure compressor, and being constructed to provide in the region of said inlet end circumferentially alternating gas passages to said low pressure turbine and spaces for air entry to said inlet, whereby there is intersection of flow paths of air entering the compressor and gas entering the turbine.

WILLIAM REDE HAWTHORNE.

REFERENCES CITED

The following references are of record in the file of this patent:

UNITED STATES PATENTS

| Number | Name | Date |
|---|---|---|
| 2,050,349 | Lysholm et al. | Aug. 11, 1936 |
| 2,318,905 | Traupel | May 11, 1943 |

OTHER REFERENCES

Ser. No. 367,666, Anxionnaz et al. (A. P. C.), published May 25, 1943.